United States Patent [19]

Garrett et al.

[11] 4,194,596

[45] Mar. 25, 1980

[54] DISC BRAKE HOUSING ASSEMBLY

[75] Inventors: Wayne H. Garrett, Troy; Richard F. Neuman, Farmington, both of Mich.

[73] Assignee: Eaton Corporation, Cleveland, Ohio

[21] Appl. No.: 974,391

[22] Filed: Dec. 29, 1978

[51] Int. Cl.² ............................................. F16D 55/224
[52] U.S. Cl. .................................... 188/72.7; 188/366
[58] Field of Search .................. 74/110; 188/59, 70 R, 188/71.7, 71.9, 72.1, 72.4, 72.7, 343, 366

[56] References Cited

U.S. PATENT DOCUMENTS

| | | | |
|---|---|---|---|
| 3,547,229 | 12/1970 | Pollinger et al. | 188/59 |
| 3,966,028 | 6/1976 | Anderson et al. | 188/71.9 X |
| 4,064,973 | 12/1977 | Deem et al. | 188/71.7 |

Primary Examiner—Duane A. Reger
Attorney, Agent, or Firm—R. J. McCloskey; D. Wood

[57] ABSTRACT

A housing assembly for a wedge type disc brake in which the wedge actuator is housed in a radially disposed aluminum housing member which is clamped between the inboard end of a ferrous caliper housing member and a ferrous end plate by axial bolts passing through the end plate and the aluminum housing member for threaded engagement with bores in the inboard end of the caliper housing. The inboard face of the aluminum housing member has an opening opposite the wedge actuator which is closed by the end plate so that the inboard rollers of the roller bearing assembly interconnecting the wedge actuator and the push rod bear directly on the outboard face of the end plate. The braking force generated at the interface of the wedge actuator and the push rod is thus transferred to the end plate and absorbed by tensioning of the bolts, thereby relieving the aluminum housing of any significant tensile loading.

13 Claims, 3 Drawing Figures

DISC BRAKE HOUSING ASSEMBLY

BACKGROUND OF THE INVENTION

This invention relates to disc brakes for vehicular applications and, more particularly, to a disc brake housing assembly especially suited for heavy duty truck applications.

Disc brakes have steadily replaced drum brakes in many passenger car applications. However, in heavy duty truck applications, disc brakes have made only small and slow inroads. The slow acceptance of disc brakes in the heavy duty truck market has been a function of the extreme cost consciousness of that market. Specifically, since disc brakes cost more initially and deliver performance improvements that are not dramatic, their net cost effectiveness has been questionable. Disc brakes do, however, have an inherent gross weight advantage over comparable drum brakes; and, given the legally established limits on gross vehicle weight, weight savings on any significant item of equipment on a heavy duty truck translate into increased cargo carrying capacity - and therefore increased profitability. Accordingly, the extent to which disc brakes will be successful in replacing drum brakes in heavy duty truck applications will be heavily dependent on the extent to which disc brakes can be lightened without decreasing their braking effectiveness.

SUMMARY OF THE INVENTION

Accordingly, it is an object of the present invention to provide a disc brake that is optimally light in weight and yet extremely effective in performance.

A more specific object is to provide a disc brake housing assembly that is optimally light in weight and therefore ideally suited for heavy duty truck applications.

The present invention relates to a disc brake of the caliper type in which a generally radially oriented wedge type actuator acts through a bearing assembly to move a generally axially oriented push rod assembly into braking coaction with brake pads carried by the caliper in response to brake apply, or radially inward, movement of the wedge actuator. According to an important feature of the invention, the brake housing assembly includes a first member which includes a portion forming the caliper; a second member which includes a radially extending tubular portion housing the wedge actuator and which is secured to a reaction portion of the housing assembly; an end plate closing an opening in the inboard face of the radially extending tubular housing portion; and a plurality of elongated fasteners which engage the end plate and the reaction portion of the housing and thereby clamp the second housing member between the end plate and the reaction portion of the housing assembly. The end plate is positioned with its outboard face rollably engaging the inboard element of the bearing assembly so that, upon brake apply movement of the push rod assembly in response to brake apply movement of the wedge actuator, the braking force generated at the interface between the wedge actuator and the push rod assembly is transferred through the inboard bearing element to the end plate and is thereafter absorbed by tensioning of the fastener members. This arrangement removes virtually all tension loading from the second housing member, i.e., the housing member housing the wedge actuator, and allows that member to be formed of a relatively low strength and low weight material such as aluminum, thereby allowing the housing to be considerably lightened as compared to a construction utilizing all ferrous materials.

According to another feature of the invention, the reaction portion in which the fastening members are anchored is constituted by the inboard end portion of a tubular housing section formed as an axial inboard extension of the caliper housing member. This arrangement allows the fastener length to be held within acceptable stretch limits and yet allows the entire wedge actuator housing to be formed of the lightweight material.

These and other objects, features and advantages of the invention will be apparent from the accompanying drawings and from the description of the preferred embodiment.

DETAILED DESCRIPTION OF THE PREFERRED EMBODIMENT

Figure 1:
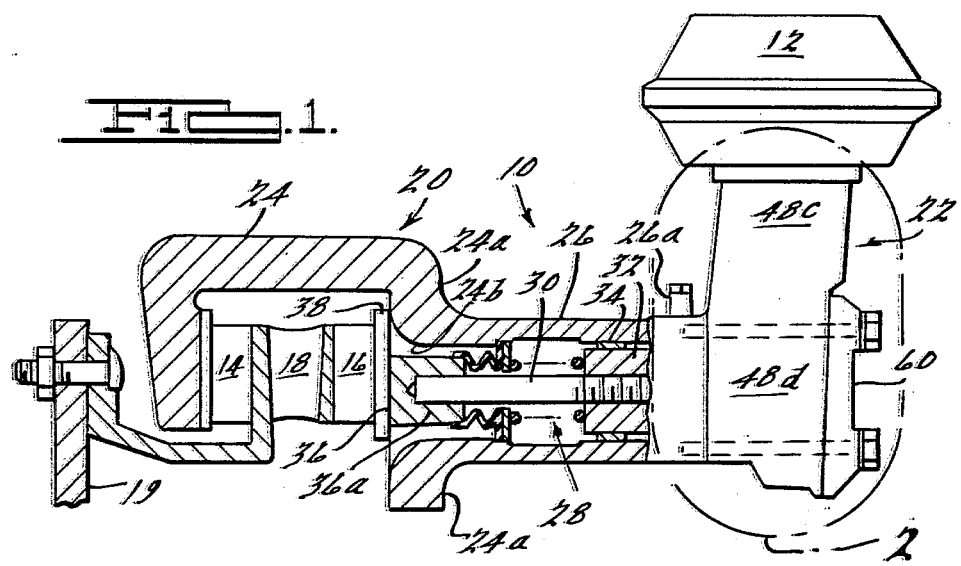
FIG. 1 is a view of a vehicular disc brake embodying the invention housing assembly.

The disc brake of FIG. 1, broadly considered, includes a housing assembly 10, an air motor 12, brake pads 14 and 16, and a disc 18. Disc 18 is secured to wheel 19 of an associated vehicle, and brake pads 14, 16 are arranged to press against the opposite faces of disc 18.

Housing assembly 10 includes a first housing member 20 and a second housing member 22.

First housing member 20 is formed as a ferrous sand casting, preferably of ductile iron, and includes a caliper portion 24 and a push rod housing portion 26 formed as a tubular, inboard extension of the inboard web 24a of caliper portion 24. A push rod assembly 28 is slideably mounted in housing portion 26 for brake apply and release movement along a line of action generally parallel to the axis of wheel 19. Push rod assembly 28 includes a push rod 30 and an adjuster nut 32. Adjuster nut 32 is journalled in housing portion 26 by a bushing 34 and threadably receives the inboard end of push rod 30. The other, or outboard, end of push rod 30 is received with a press fit in the hub portion 36a of a bridge bar 36, which in turn presses against the backing plate 38 of inboard pad 16. An opening 24b extends axially through caliper web portion 24a to form a continuous axial passage with the tubular interior of housing portion 26. The outboard end of push rod 30 is positioned in opening 24b, and the central axis of tubular housing portion 26 coincides with the central axis of opening 24b. Caliper portion 24 embraces the outer periphery of disc 18 and is slideably mounted on a torque plate (not shown) secured to a fixed portion of the vehicle. When push rod 30 is moved in a brake apply direction in response to suitable actuation of air motor 12, bridge bar 36 presses inboard pad 16 against the inboard face of disc 18, whereafter housing assembly 10 slides inboard on the torque plate to press outboard pad 14 against the outboard face of disc 18 and thereby brake wheel 19, all in known manner.

Second housing member 22 is formed as an aluminum die casting and is secured to the inboard end of push rod housing portion 26.

Figure 3:
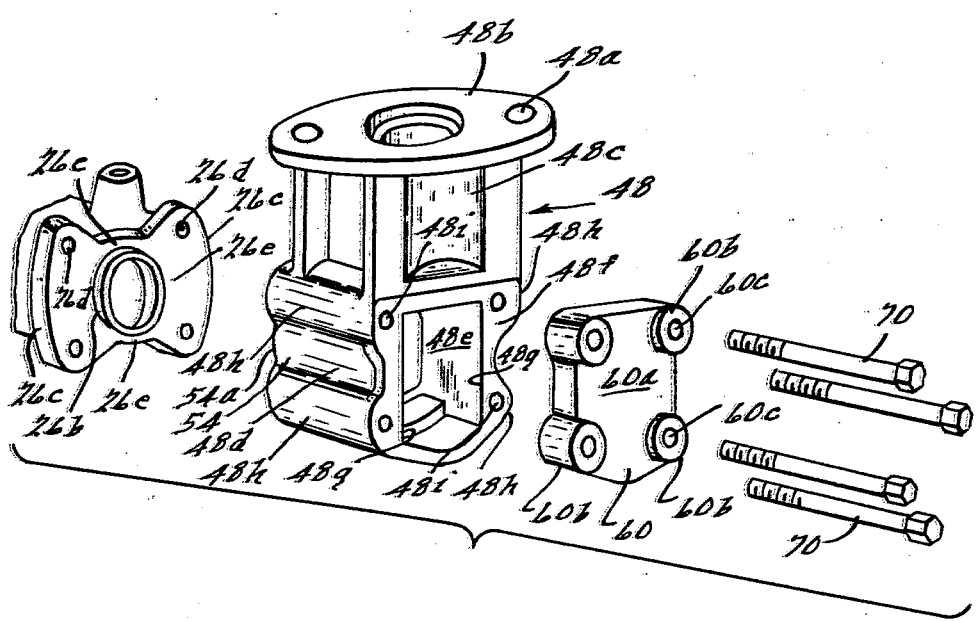
FIG. 3 is a perspective exploded view of the invention housing assembly.
Figure 2:
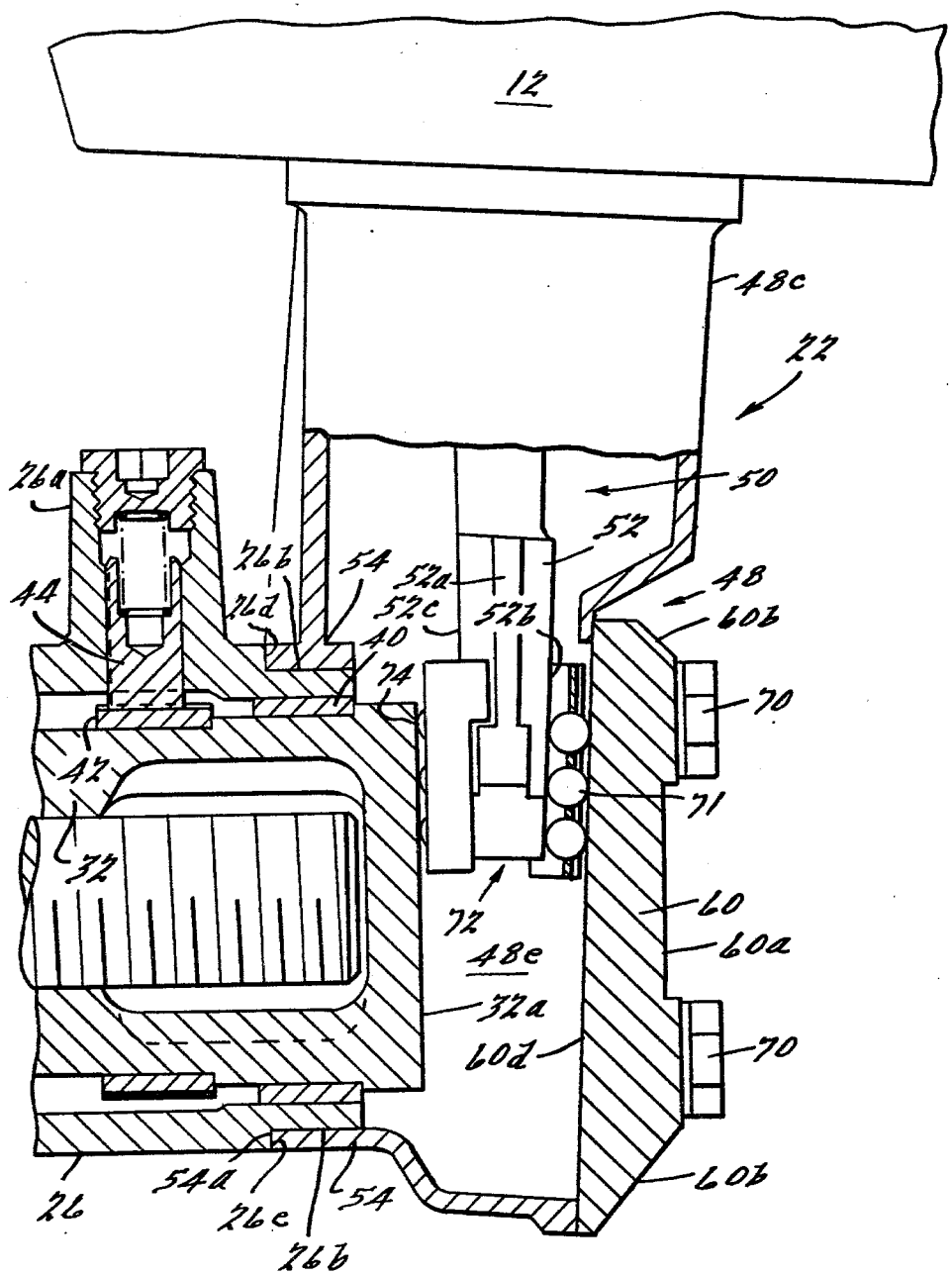
FIG. 2 is a view on an enlarged scale of the portion of FIG. 1 within the circle 2.

Referring now to FIGS. 2 and 3, the outboard end of adjuster nut 32 presents an end face 32a and a bushing 40 coacts with bushing 34 to journal nut 32 in housing 26 while allowing axial movement of the nut in the housing. A collar 42 is press fit on nut 32 between bushings 34 and 40. Collar 42 is provided with an external helical ratchet thread and coacts with corresponding ratchet teeth on a spring loaded ratchet pawl 44 mounted in a boss 26a formed in housing portion 26. Pawl 44 and collar 42 coact to provide, in known manner, automatic self adjustment of the push rod assembly in response to brake pad wear. See, for example, U.S. Pat. No. 3,068,964.

The inboard end of housing portion 26 is configured to provide a film foundation for mounting housing member 22. Specifically, the inboard end of housing portion 26 is necked down to provide a flange 26b, and a pair of mounting ears 26c extend radially outwardly from the main body of housing portion 26. A threaded axial through bore 26d is formed adjacent each end of each ear. The four bores 26d are evenly arrayed about the central axis of housing portion 26. Ears 26c coact with the shoulder formed at the juncture of flange 26b and the main body of housing portion 26 to define an annular inboard face 26e against which housing member 22 is butted in the assembled relation of the housing members.

Housing member 22 includes a tubular radially extending portion 48 adapted to receive a wedge actuator 50. Wedge actuator 50 is driven by the piston rod of air motor 12. Air motor 12 is secured to the free end of housing portion 48 by studs (not shown) carried by the air motor and passing through bores 48a in mounting flange 48b. The radially outer portion 48c of housing portion 48 is circular in cross section and the radially inner portion 48d of housing portion 48 is generally rectangular in cross section and includes parallel side walls 48e forming slideways to slideably guide the opposite edge faces 52a of wedge portion 52 of actuator 50. Housing member 22 further includes a circular flange portion 54 adapted to fit over flange 26b of housing portion 26 with the outboard edge 54a of flange 54 butting against inboard annular face 26e of housing portion 26. The flat inboard face 48f of radially inner housing portion 48d is open to define a generally rectangular window or opening 48g. Radially inner housing portion 48d is locally thickened at its four corners to provide for axially extending bosses 48h. Four bores 48i extend through bosses 48h in respective axial alignment with threaded through bores 26d in housing portion 26.

An end plate 60, formed as a ferrous sand casting, preferably of pearlitic malleable iron, seats on inboard face 48f of housing portion 48d and thereby closes window or opening 48g. Plate 60 includes a generally planar main body portion 60a and four bosses 60b at its four corners accommodating through bores 60c in respective axial alignment with bores 26d and bores 48i. The outboard face 60d of end plate 60 is finish hardened, as by flame hardening, induction hardening, or electron beam hardening, and is finish ground after hardening.

Housing members 22 and 26 and end plate 60 are held in their assembled relationships by four bolts 70 passing through aligned bores 60c and 48i for threaded engagement with bores 26d. Bolts 70 are preferably SAE Grade 8 and may, for example, be five inches long and ½ inch in diameter with a thread of 13 NC. Bolts 70 are preferably tightened to an extent to compress housing member 22 between end plate 60 and housing portion 26 while generating a preload in bolts 70.

In the assembled relation of housing members 22 and 26 and end plate 60, as best seen in FIG. 2, the inboard rollers 71 of a roller bearing assembly 72 rollably engage the inboard wedge face 52b of actuator wedge portion 52 and the outboard face 60d of end plate 60; and the outboard rollers 74 of assembly 72 rollably engage the outboard wedge face 52c of wedge portion 52 and end face 32a of adjuster nut 32. Many varieties of roller bearing assemblies may be employed at the interface of wedge portion 52 and end face 32a. The preferred variety, and the variety disclosed in the drawings, is more fully described in U.S. Pat. application Ser. No. 955,813, filed Oct. 30, 1978, and assigned to the assignee of the present application.

When wedge actuator 50 is moved in a brake apply direction by actuation of air motor 12, wedge portion 52 is wedged between adjuster nut end face 32a and end plate outboard surface 60d to move push rod assembly 28 axially outboard and apply brake pads 14, 16. The axial braking force generated at the interface of the actuator and push rod assembly upon brake actuation is substantial, reaching a value of 40,000 pounds in heavy duty truck applications. In the disclosed arrangement, aluminum die casting member 22 never sees this load but rather the load is transmitted through inboard rollers 71 to end plate 60 and is thereafter absorbed by tensioning of bolts 70 with the inboard end of housing portion 26, by virtue of the threaded engagement of bolts 70 in bores 26d, acting as an anchor or foundation for bolts 70. The inboard end of housing portion 26 thus acts as a reaction portion of the housing assembly in the sense that it ultimately absorbs, or reacts against, the force generated at the wedge interface. The described arrangement allows housing 22 to be formed of an optimally lightweight material without regard for the tensile strength of the material, thereby allowing the housing assembly to be significantly lightened with corresponding weight savings in the overall brake assembly and consequent commensurate increases in vehicle payload.

While a preferred embodiment of the invention has been illustrated and described in detail, it will be apparent that various changes may be made in the preferred embodiment without departing from the scope or spirit of the invention.

What is claimed is:

1. A housing assembly for use with a vehicular disc brake of the type including a wedge actuator mounted for brake apply and release movement along a line of action generally normal to the wheel axis of the associated vehicle and adapted to be secured at its radially outer end to the piston rod of an associated air motor and defining a wedge portion at its radially inner end presenting inboard and outboard wedge faces, and a push rod assembly slideably mounted for brake apply and release movement along a line of action generally parallel to said axis; said housing assembly including:

A. a first member including a caliper portion adapted to embrace the outer periphery of a disc secured to a wheel of the associated vehicle and including an inboard web portion generally normal to the wheel axis and having an opening extending axially therethrough adapted to receive the outboard end of the push rod assembly;

B. means defining a reaction portion formed of a relatively high weight and high strength material and presenting an annular inboard face generally centered on the line of action of the push rod assembly;

C. a second member formed of a relatively low strength and relatively low weight material secured to said annular inboard face and including a tubular radially extending portion spaced inboard from said inner web portion and adapted to house the wedge actuator with a bearing member in rolling contact with the outboard face of the wedge portion of the actuator and the inboard end face of the push rod assembly;

D. means defining an opening in the inboard face of said radially extending portion opposite the inboard face of the wedge portion of the wedge actuator;

E. an end plate of relatively high strength and relatively high weight material closing said inboard opening and having an outboard face adapted to rotatably engage a bearing member in rolling contact with the inboard face of the wedge portion of the actuator; and F. a plurality of axially extending elongated fastener members secured at their outboard ends to said reaction portion and at their inboard ends to said end plate and clamping said second housing member between said annular inboard face and the outboard face of said end plate, whereby, upon brake apply movement of the wedge actuator, the push rod assembly is moved axially to effect actuation of brake pads carried by said caliper portion and the braking force generated at the wedge interface between the wedge portion and the push rod assembly is absorbed by tensioning of said fastener members.

2. A housing assembly according to claim 1 wherein

G. said first member further includes a tubular portion extending axially from the inboard face of said inboard web portion concentric with the axis of said inboard web portion opening and adapted to slideably receive the push rod assembly; and H. said reaction portion is constituted by the inboard end portion of said axially extending tubular portion.

3. A housing assembly according to claims 1 or 2 wherein the interface between said second member and said annular inboard face is located immediately outboard of said tubular radially extending portion.

4. A vehicular disc brake comprising:

A. a housing assembly including
1. a first member including a caliper portion adapted to embrace the outer periphery of a disc secured to a wheel of an associated vehicle and including an inboard web portion generally normal to the wheel axis and having an opening extending axially therethrough;
2. means defining a reaction portion formed of a relatively high weight and relatively high strength material and presenting an annular inboard face generally centered on the axis of said inboard web portion opening;
3. a second member formed of a relatively low strength and relatively low weight material secured to said annular inboard face and including a tubular radially extending portion spaced inboard from said inner web portion;
4. means defining an opening in the inboard face of said radially extending portion passing the axis of said inboard web portion opening;
5. an end plate of relatively high strength and relatively high weight material closing said inboard opening; and
6. a plurality of axially extending elongated fastener members secured at their outboard ends to said reaction portion and at their inboard ends to said end plate and clamping said second housing member between said annular inboard face and the outboard face of said end plate;

B. a wedge actuator slideably mounted in said radially extending housing portion for brake apply and release movement along a line of action generally normal to said axes, said actuator being adapted to be secured at its radially outer end to the piston rod of an air motor secured to the radially outer end of said radially extending portion and defining a wedge portion at its radially inner end presenting inboard and outboard wedge faces;

C. a push rod assembly slideably mounted in said housing assembly for brake apply and release movement along a line of action generally coinciding with said web opening axis and presenting an inboard end face adjacent said actuator wedge portion; and D. a bearing assembly including at least one bearing member in rolling contact with said end face of said push rod assembly and the outboard wedge face of said actuator wedge portion and at least one other bearing member in rolling contact with the inboard wedge face of said actuator wedge portion and the outboard face of said end plate, whereby upon brake apply movement of said wedge actuator, said push rod assembly is moved axially to effect actuation of brake pads carried by said caliper portion and the braking force generated at the wedge interface between said wedge portion and said push rod assembly is absorbed by tensioning of said fastener members.

5. A vehicular disc brake according to claim 4 wherein

E. said first member further includes a tubular portion extending axially from the inboard face of said inboard web portion concentric with the axis of said inboard web portion and slideably mounting said push rod assembly; and F. said reaction portion is constituted by the inboard end portion of said axially extending tubular portion.

6. A vehicular disc brake according to claims 4 or 5 wherein the interface between said second member and said annular inboard face is located immediately outboard of said tubular radially extending portion.

7. A vehicular disc brake comprising:

A. a housing assembly including
1. a first member, formed of a relatively high strength and relatively high weight material, including a caliper portion adapted to embrace the outer periphery of a disc secured to a wheel of an associated vehicle and including an inboard web portion generally normal to the wheel axis, and
2. a second member, formed of a relatively low strength and low weight material, secured to an inboard face of said first member and including a tubular radially extending portion spaced inboard from said inboard web portion;

B. a wedge actuator slideably mounted in said radially extending portion for brake apply and release movement along a line of action generally normal to said axis, said actuator being adapted to be secured at its radially outer end to the piston rod of an air motor secured to the radially outer end of said radially extending portion and defining a wedge portion at its radially inner end presenting inboard and outboard wedge faces;

C. a push rod assembly slideably mounted in said housing assembly for brake apply and release movement along a line of action generally parallel to said axis and presenting an inboard end face adjacent said wedge portion;

D. means defining an opening in the inboard face of said radially extending portion generally inboard of said wedge portion;

E. an end plate of relatively high strength and relatively high weight material closing said inboard opening;

F. a plurality of axially extending elongated fastener members secured at their outboard ends to the said first member adjacent said inboard face and at their inboard ends to said end plate and clamping said second housing member between the outboard face of said end plate and said inboard face of said first member; and G. a bearing assembly including at least one bearing member in rolling contact with said end face of said push rod assembly and the outboard wedge face of said actuator wedge portion and at least one other bearing member in rolling contact with the inboard wedge face of said actuator wedge portion and the outboard face of said end plate, whereby, upon brake apply movement of said wedge actuator, said push rod is moved axially to effect actuation of brake pads carried by said caliper portion and the braking force generated at the wedge interface between said wedge portion and said push rod assembly is absorbed by tensioning of said fastener members.

8. A vehicular disc brake according to claim 7 wherein

H. said first member further includes a tubular portion extending axially from the inboard face of said inboard web portion generally concentric with the line of action of said push rod assembly and slideably mounting that assembly; and I. said inboard face of said first member is constituted by an end face of said axially extending tubular portion.

9. A vehicular disc brake according to claim 8 wherein the interface between said first and second members is immediately outboard of said tubular radially extending portion.

10. In a vehicular disc brake of the type including a caliper assembly adapted to embrace the outer periphery of a disc secured to a wheel of an associated vehicle and including an inboard web portion generally normal to the wheel axis; and an actuator assembly carried by the inboard web portion of the caliper assembly; the improvement wherein said actuator assembly comprises:

A. a generally L-shaped housing assembly including
 1. a first axially disposed tubular housing section, formed of a relatively high strength, relatively high weight material, extending axially from the inboard face of said inboard web and
 2. a second tubular housing section, formed of a relatively low strength, low weight material, secured to the free open end of said first housing section and including a tubular radially extending portion;

B. a wedge actuator slideably mounted in said radially extending tubular housing portion for brake apply and release movement along a line of action generally normal to said axis, said actuator being adapted to be secured at its radially outer end to the piston rod of an air motor secured to the radially outer end of said radially extending housing portion and defining a wedge portion at its radially inner end presenting inboard and outboard wedge faces;

C. a push rod assembly slideably mounted in said first housing section for brake apply and release movement along a line of action generally parallel to said axis and presenting an inboard end face adjacent said wedge portion;

D. means defining an opening in the inboard face of said radially extending housing portion inboard of said wedge portion;

E. an end plate of relatively high strength material closing said inboard opening;

F. a plurality of axially extending elongated fastener members secured at their outboard ends to the inboard end of said first housing section and at their inboard ends to said end plate and clamping said second housing section between the outboard face of said end plate and the inboard end of said first housing section; and G. a bearing assembly including at least one bearing in rolling contact with said end face of said push rod assembly and the outboard wedge face of said actuator wedge portion and at least one other bearing in rolling contact with the inboard wedge face of said actuator wedge portion and the outboard face of said end plate, whereby upon brake apply movement of said wedge actuator, said push rod is moved axially to effect actuation of brake pads carried by said caliper and the braking force generated at the wedge interface between said wedge portion and said push rod assembly is absorbed by tensioning of said fastener members.

11. In a vehicular disc brake of the type including a caliper assembly adapted to embrace the outer periphery of a disc secured to a wheel of an associated vehicle and including an inboard web portion generally normal to the wheel axis; and an actuator assembly carried by the inboard web portion of the caliper assembly; the improvement wherein said actuator assembly comprises:

A. a generally L-shaped housing assembly including
 1. an axially disposed tubular section, formed of a relatively high strength, relatively high weight material, extending axially from the inboard face of said inboard web and
 2. a radially disposed tubular section, formed of a relatively low strength, low weight material, secured to the free end of said axially disposed section and having an opening in its outboard face generally aligned with the open inboard end of said axially disposed section;

B. a wedge actuator slideably mounted in said radially disposed tubular housing section for brake apply and release movement along a line of action generally normal to said axis and including a wedge portion positioned within the radially inner portion of said radially disposed section and presenting inboard and outboard wedge faces;

C. a push rod assembly slideably mounted in said axially disposed tubular housing section for brake apply and release movement along a line of action generally parallel to said axis and presenting an inboard end face adjacent said wedge portion;

D. means defining an opening in the inboard face of said radially disposed housing section generally axially aligned with said outboard opening and generally inboard of said wedge portion;

E. an end plate of relatively high strength material closing said inboard opening;

F. a plurality of axially extending elongated fastener members secured at their outboard ends to the inboard end of said axially disposed housing section and at their inboard ends to said end plate and clamping said radially disposed housing section between the outboard face of said end plate and the inboard end of said axially disposed housing section; and G. a bearing assembly including at least one bearing in rolling contact with said end face of said push rod assembly and the outboard wedge face of said actuator wedge portion and at least one other bearing in rolling contact with the inboard wedge face of said actuator wedge portion and the outboard face of said end plate, whereby upon brake apply movement of said wedge actuator, said push rod is moved axially to effect actuation of brake pads carried by said caliper and the braking force generated at the wedge interface between said wedge portion and said push rod assembly is absorbed by tensioning of said fastener members.

12. A vehicular disc brake according to claim 11 wherein

H. said bearings are roller bearings.

13. A housing assembly according to claims 1, 2, 4, 5, 7, 8, 9, 10, 11, or 12 wherein I. said relatively high weight and high strength material is a ferrous material and J. said relatively low strength and low weight material is an aluminum material.

* * * * *